US00RE44209E

(19) United States
(12) Reissued Patent
Goodman

(10) Patent Number: US RE44,209 E
(45) Date of Reissued Patent: May 7, 2013

(54) METHOD AND SYSTEM FOR REAL-TIME CONTROL OF DOCUMENT PRINTING

(75) Inventor: Daniel I. Goodman, Beit Shemesh (IL)

(73) Assignee: Alearo Properties Limited Liability Company, Dover, DE (US)

(21) Appl. No.: 13/397,620

(22) Filed: Feb. 15, 2012

Related U.S. Patent Documents

Reissue of:
(64) Patent No.: 7,664,956
Issued: Feb. 16, 2010
Appl. No.: 10/141,308
Filed: May 7, 2002

U.S. Applications:
(63) Continuation-in-part of application No. 09/774,236, filed on Jan. 29, 2001, now abandoned, which is a continuation-in-part of application No. 09/397,331, filed on Sep. 14, 1999, now Pat. No. 6,298,446, which is a continuation-in-part of application No. 09/313,067, filed on May 17, 1999, now Pat. No. 6,209,103.

(30) Foreign Application Priority Data

Jun. 14, 1998 (IL) ..... 124895
Nov. 16, 1998 (IL) ..... 127093
Dec. 30, 1998 (IL) ..... 127869

(51) Int. Cl.
*H04L 29/06* (2006.01)

(52) U.S. Cl.
USPC ..... 713/176; 380/51; 380/55; 380/201; 726/27

(58) Field of Classification Search ..... 713/176; 380/51, 55, 201, 252; 726/27; 399/366
See application file for complete search history.

(56) References Cited

U.S. PATENT DOCUMENTS 4,405,829 A 9/1983 Rivest
4,586,811 A 5/1986 Kubo et al.
4,827,508 A 5/1989 Shear
4,977,594 A 12/1990 Shear (Continued)

FOREIGN PATENT DOCUMENTS

EP 1517215 3/2005
EP 1517215 A2 3/2005
WO WO 98/25373 6/1998
WO WO 98/44424 10/1998

OTHER PUBLICATIONS

Stolowitz Ford Cowger LLP; Related Case Listing; Jan. 16, 2012; 1 Page.

(Continued)

*Primary Examiner* — Michael Pyzocha
(74) *Attorney, Agent, or Firm* — Stolowitz Ford Cowger LLP

(57) ABSTRACT

A method for secure printing is presented. A document management system (DMS) is provided within a server computer for storing, displaying and printing a plurality of documents. At least a portion of the documents require authentication information for displaying and printing. A web-based capture protection system is provided that prevents proprietary content displayed on a display device from being screen-captured. The web-based capture protection system is combined with the DMS to augment the DMS with capture protection of displayed documents, including intercepting retrieval requests from a client computer to display documents from the DMS.

34 Claims, 9 Drawing Sheets

U.S. PATENT DOCUMENTS 4,991,118 A 2/1991 Akiyama et al.
5,012,232 A 4/1991 Fadem
5,050,213 A 9/1991 Shear
5,300,946 A 4/1994 Patrick
5,303,370 A 4/1994 Brosh et al.
5,410,598 A 4/1995 Shear
5,454,067 A 9/1995 Tsai
5,509,070 A 4/1996 Schull
5,533,124 A 7/1996 Smith et al.
5,559,933 A 9/1996 Boswell
5,570,306 A 10/1996 Soo
5,590,258 A 12/1996 Aoyama
5,633,932 A * 5/1997 Davis et al. ..... 713/176
5,636,292 A 6/1997 Rhoads
5,638,513 A 6/1997 Ananda
5,642,207 A 6/1997 Smitt
5,710,834 A 1/1998 Rhoads
5,715,403 A 2/1998 Stefik
5,721,788 A 2/1998 Powell et al.
5,745,254 A 4/1998 Satou
5,745,360 A 4/1998 Leone et al.
5,745,604 A 4/1998 Rhoads
5,748,763 A 5/1998 Rhoads
5,748,783 A 5/1998 Rhoads
5,754,170 A 5/1998 Ranganathan
5,758,068 A 5/1998 Brandt et al.
5,761,669 A 6/1998 Montague et al.
5,761,686 A 6/1998 Bloomberg
5,764,770 A 6/1998 Schipper et al.
5,765,152 A 6/1998 Erickson
5,768,426 A 6/1998 Rhoads
5,778,372 A 7/1998 Cordell et al.
5,781,914 A 7/1998 Stork et al.
5,790,117 A 8/1998 Halviatti et al.
5,801,679 A 9/1998 McCain
5,801,689 A 9/1998 Huntsman
5,805,724 A 9/1998 Metcalfe et al.
5,809,160 A 9/1998 Powell et al.
5,822,432 A 10/1998 Moskowitz et al.
5,822,436 A 10/1998 Rhoads
5,832,119 A 11/1998 Rhoads
5,835,712 A 11/1998 DuFresne
5,835,722 A 11/1998 Bradshaw et al.
5,838,902 A 11/1998 Shin
5,841,886 A 11/1998 Rhoads
5,841,978 A 11/1998 Rhoads
5,850,481 A 12/1998 Rhoads
5,862,260 A 1/1999 Rhoads
5,870,544 A 2/1999 Curtis
5,872,915 A 2/1999 Dykes et al.
5,875,249 A 2/1999 Mintzer et al.
5,875,296 A 2/1999 Shi et al.
5,881,287 A 3/1999 Mast
5,892,900 A 4/1999 Ginter et al.
5,893,101 A 4/1999 Balogh et al.
5,900,005 A 5/1999 Saito
5,901,277 A 5/1999 Chu et al.
5,905,505 A 5/1999 Lesk
5,920,848 A 7/1999 Schutzer et al.
5,954,028 A 9/1999 Miyashita et al.
5,968,119 A 10/1999 Stedman et al.
5,974,441 A 10/1999 Rogers et al.
5,982,931 A 11/1999 Ishimaru
5,983,227 A 11/1999 Nazem et al.
5,983,351 A 11/1999 Glogau
5,986,676 A 11/1999 Dwin et al.
5,991,399 A 11/1999 Graunke et al.
5,999,622 A 12/1999 Yasukawa et al.
5,999,941 A 12/1999 Andersen
6,009,410 A 12/1999 LeMole et al.
6,011,905 A 1/2000 Huttenlocher et al.
6,014,702 A 1/2000 King et al.
6,032,150 A 2/2000 Nguyen
6,038,031 A 3/2000 Murphy
6,052,780 A 4/2000 Glover
6,055,530 A 4/2000 Sato
6,088,355 A 7/2000 Mills et al.
6,119,108 A 9/2000 Holmes et al.
6,121,970 A 9/2000 Guedalia
6,154,844 A 11/2000 Touboul et al.
6,178,243 B1 1/2001 Pomerantz et al.
6,202,092 B1 3/2001 Takimoto
6,205,480 B1 3/2001 Broadhurst et al.
6,209,036 B1 3/2001 Aldred et al.
6,209,103 B1 3/2001 Schreiber et al.
6,212,329 B1 4/2001 Sugahara
6,236,387 B1 5/2001 Imada
6,240,450 B1 5/2001 Sharples et al.
6,260,141 B1 7/2001 Park
6,263,365 B1 7/2001 Scherpbier
6,275,599 B1 8/2001 Adler et al.
6,282,362 B1 8/2001 Murphy et al.
6,282,653 B1 8/2001 Berstis et al.
6,289,137 B1 9/2001 Sugiyama et al.
6,298,422 B1 10/2001 Spilo et al.
6,298,446 B1 10/2001 Schreiber et al.
6,314,409 B2 11/2001 Schneck et al.
6,324,569 B1 11/2001 Ogilvie et al.
6,339,761 B1 1/2002 Cottingham
6,339,826 B2 1/2002 Hayes, Jr. et al.
6,343,274 B1 1/2002 McCollom et al.
6,343,738 B1 2/2002 Ogilvie
6,353,892 B2 3/2002 Schreiber et al.
6,385,728 B1 5/2002 DeBry
6,438,575 B1 8/2002 Khan et al.
6,460,140 B1 10/2002 Schoch et al.
6,463,467 B1 10/2002 Mages et al.
6,466,328 B1 * 10/2002 Bradley et al. ..... 358/1.15
6,470,450 B1 10/2002 Langford et al.
6,480,959 B1 11/2002 Granger et al.
6,487,543 B1 11/2002 Ozaki et al.
6,557,103 B1 4/2003 Boncelet, Jr. et al.
6,587,127 B1 7/2003 Leeke et al.
6,601,108 B1 7/2003 Marmor
6,611,845 B1 8/2003 Dockter et al.
6,615,191 B1 9/2003 Seeley
6,618,484 B1 9/2003 Van Wie et al.
6,659,861 B1 12/2003 Faris et al.
6,661,904 B1 12/2003 Sasich et al.
6,664,969 B1 12/2003 Emerson et al.
6,668,246 B1 12/2003 Yeung et al.
6,675,201 B1 1/2004 Parkkinen
6,694,434 B1 2/2004 McGee et al.
6,766,454 B1 7/2004 Riggins
6,785,015 B1 8/2004 Smith et al.
6,804,452 B1 10/2004 Kuroda et al.
6,877,005 B2 4/2005 Hunter et al.
6,903,681 B2 6/2005 Faris et al.
6,931,532 B1 8/2005 Davis et al.
6,976,248 B2 12/2005 Balassanian
6,993,662 B2 1/2006 Rubin et al.
7,190,878 B2 3/2007 Bolduc
2001/0021926 A1 9/2001 Schneck
2001/0042045 A1 11/2001 Howard et al.
2002/0013792 A1 1/2002 Imielinski et al.
2002/0021807 A1 2/2002 Saito
2002/0026475 A1 2/2002 Marmor
2002/0059344 A1 5/2002 Britton et al.
2002/0078343 A1 6/2002 Rubin et al.
2002/0078361 A1 6/2002 Giroux et al.
2002/0112250 A1 8/2002 Koplar et al.
2002/0156742 A1 10/2002 Ogino et al.
2002/0188570 A1 12/2002 Holliman et al.
2002/0194485 A1 12/2002 Ram et al.
2003/0133702 A1 7/2003 Collart
2003/0151766 A1 * 8/2003 Clough et al. ..... 358/1.15
2004/0054630 A1 3/2004 Ginter et al.
2004/0225890 A1 11/2004 Kang et al.

OTHER PUBLICATIONS

Yergeau et al., "Internationalization of the Hypertext Markup Language," RFC 2070, Jan. 1997, Network Working Group.
Darnell et al., "HTML 4 Second Edition Unleashed," 1999, Barns Publishing, p. 1079.
Yergeau, "UTF-8, a transformation format of Unicode and ISO 10646," RFC 2044, Oct. 1996, Network Working Group.

Chapter 3—Understanding Image Guardian—3 pages, Sep. 11, 1998.
Chapter 3—Understanding Web Referee—3 pages, Sep. 11, 1998.
"Copysight", http://www.ip2.com, Jul. 5, 1999.
"Copysight: Now You Can Protect Your Website Content on the Internet with Copysight's Suite of Software and Business Solutions", (http://www.ip2.com), 1999.
Digital Rights Management (http://www.intertrust.com), Jun. 3, 1999.
"SafeImage", (http://www.safemedia.com), Jun. 3, 1999.
"SiteShield" press release, (http://www.maximized.com/press/960529-1.html), Sep. 11, 1998.
Strom, D., "Browser: Protect Your Image on the Web", 1998 (http://www.zdnet.com).
Stirland, Sarah, ActiveX vs. Java, Wall Street & Technology, vol. 15, No. 8, p. 48, Aug. 1997.
Wen-Nung Lie, Li-Chun Chang, "Data Hiding in Images With Adaptive Numbers of Least Significant Bits Based on the Human Visual Systems," IEEE, pp. 286-290, Oct. 1999.
Sellers, Duncan, "An Introduction to Steganography," http://www.totse.com/en/privacy/encryption/163947.html, pp. 1-18, 2003.
Mynatt, et al., "Nonvisual Presentation of Graphical User Interfaces: Contrasting Two Approaches," ACM, pp. 166-172, 1994.
"Overview of Cryptographic Services," Copyright X/Open Company Limited, 1996, 5 pp., http://opengroup.org/public/tech/security/gcs/overview.htm.
"Products—SiteShield—Copyright Issues," dated Sep. 11, 1998, 4 pp., Copyright 1997, Maximized Software, Inc. Press Release, "Maximized Software Launches Deterrent Against Internet Copyright Pirates," SiteShield: New Product PR, dated Sep. 11, 1998, Copyright 1996, Maximized Software, Inc.
Deterrent Against Internet Copyright Pirates, SiteShield: New Product PR, dated Sep. 11, 1998, Copyright 1996, Maximized Software, Inc.
Digimarc & Copyright Protection (http://digimarc.com), 1999.
"SiteShield" product details, (http://www.maximized.com/products/siteshield/why.html), Sep. 11, 1998.
"Softlock.com" (http://www.softlock.com), Jun. 3, 1999.
"Secure Hash Standard," *Federal Information Processing Standards, Publication 1801-1*, http://www. itl.nist/gov/fipspubs/fip180-1.htm,18 pp., Apr. 17, 1995.
Web Page Article, "Track Images Across the Web," Digimarc Corporation, All rights reserved, Copyright 1996-1999, http://www.digimarc.com/applications/copyright/copyright_bod.htm.
Web Page Article, "Welcome to SafeMedia," Copyright SafeMedia$^{SM}$, SafeMedia is a service mark of Internet Expressions, Inc., Last Updated May 29, 1999, http://www.safemedia.com.

* cited by examiner

METHOD AND SYSTEM FOR REAL-TIME CONTROL OF DOCUMENT PRINTING

Matter enclosed in heavy brackets [ ] appears in the original patent but forms no part of this reissue specification; matter printed in italics indicates the additions made by reissue.

CROSS REFERENCES TO RELATED APPLICATIONS

This application is a *reissue of U.S. patent application Ser. No. 10/141,308, filed on May 7, 2002, now issued as U.S. Pat. No. 7,664,956, which is a* continuation-in-part of [assignee's pending] application U.S. Ser. No. 09/774,236 filed on Jan. 29, 2001 *now abandoned*, entitled "Method and system for copy protection of data content," which is a continuation-in-part of [assignee's] application U.S. Ser. No. 09/397,331 filed on Sep. 14, 1999, entitled "Method and system for copyright protection of digital images transmitted over networks" (now U.S. Pat. No. 6,298,446), which *claims priority to Israeli patents IL 127093, filed on Nov. 16, 1998, and IL 127869, filed on Dec. 30, 1998 and* is a continuation-in-part of [assignee's] application U.S. Ser. No. 09/313,067 filed on May 17, 1999, entitled "Methods and apparatus for preventing reuse of text, images and software transmitted via networks" (now U.S. Pat. No. 6,209,103), *which, in turn, claims priority to Israeli patent IL 124895, filed Jun. 14, 1998,* each of which is incorporated by reference herein.

FIELD OF THE INVENTION

The present invention relates to controlled printing of documents within a content copy protection system.

BACKGROUND OF THE INVENTION

Printing electronic documents within a personal computer operating system, such as Microsoft Windows, typically involves selecting a printer from a list of available local and network printers, selecting print options for the selected printer, and issuing a print request. A printer driver for the selected printer then sends data for printing to a print spool, which is a buffer feeding into a printer board.

After a print request is issued, the document is listed in a print queue for the selected printer, while the print job is pending. An administrator or the user issuing the print request typically can delete the job prior to its execution, and abort the print job while it is executing.

Prior art print workflows do not enable real-time control of printing, other than deleting and aborting a print job. User and document access control parameters and printer control parameters are pre-configured. Today's digital rights management and secure document environments focus on copy protection, but print control is only enforced by pre-set parameters, and by enabling or disabling printing altogether.

Thus there is a need for a dynamic print controller that can control print jobs on the fly, after the print request is issued.

SUMMARY OF THE INVENTION

The present invention provides a method and system for controlled printing of documents within a content copy protection system. The present invention enables inter alia real-time document access control, real-time document watermarking, and real-time control of which printers a document can be printed on.

There is thus provided in accordance with a preferred embodiment of the present invention a method for real-time control of document printing, including intercepting a print request for an original document by a user, obtaining print information corresponding to the original document, in response to the intercepting, the print information including an address for a print server, re-issuing the print request by a server computer, and sending the print request and the print information to the print server.

There is further provided in accordance with a preferred embodiment of the present invention a method for real-time control of document printing, including in response to a request by a client computer to print an original document, obtaining document print information corresponding to the original document, generating a modified document comprising embedding the document print information within the original document, and sending the modified document to a print server.

There is yet further provided in accordance with a preferred embodiment of the present invention a system for real-time control of document printing, including an administrative tool for specifying document-specific print information for a collection of original documents, a server computer including an interceptor for intercepting a print request for an original document, a print control processor for obtaining print information specific to the original document, and a request generator for re-issuing the print request, and a client computer including a request generator for issuing a print request for an original document, a transmitter for sending the print request and print information specific to the original document to the server computer.

There is additionally provided in accordance with a preferred embodiment of the present invention a system for real-time control of document printing, including a data storage for providing document print information corresponding to an original document, a document generator for obtaining document print information corresponding to an original document and for generating a modified document by embedding the document print information within the original document, in response to a request by a user to print the original document, and a transmitter for sending the modified document to a print server.

There is moreover provided in accordance with a preferred embodiment of the present invention a method for real-time control of document printing, including intercepting a print request for an original document by a user, obtaining print information corresponding to the original document, in response to the intercepting; and logging the print request and at least a portion of the print information.

There is further provided in accordance with a preferred embodiment of the present invention a system for real-time control of document printing, including an interceptor for intercepting a print request for an original document by a user, a print control processor for obtaining print information corresponding to the original document, in response to the intercepting, and a print event logger for logging the print request and at least a portion of the print information.

There is yet further provided in accordance with a preferred embodiment of the present invention a print server including a pre-check module for dynamically processing print information at run-time, a document requester for requesting a document to be printed from a document management system, a format processor for converting a document from a native format to an internal format, and a print module for delivering content to be printed to a print spool.

There is additionally provided in accordance with a preferred embodiment of the present invention a method for serving documents to a printer, including dynamically processing print information at run-time, requesting a document to be printed from a document management system, converting a document from a native format to an internal format, and delivering content to be printed to a print spool.

There is moreover provided in accordance with a preferred embodiment of the present invention a document management system with secure printing, including a document manager for managing a storage of original documents, a user account manager for managing at least one user account, for at least one user having at least partial access to the original documents, an interceptor for intercepting a print request for an original document, and a print control processor for obtaining print information specific to the original document.

There is moreover provided in accordance with a preferred embodiment of the present invention a method for secure printing within a document management system, including managing a storage of original documents, managing at least one user account, for at least one user having at least partial access to the original documents, intercepting a print request for an original document, and obtaining print information specific to the original document.

BRIEF DESCRIPTION OF THE DRAWINGS

The present invention will be more fully understood and appreciated from the following detailed description, taken in conjunction with the drawings in which.

DETAILED DESCRIPTION OF A PREFERRED EMBODIMENT

Figure 1:
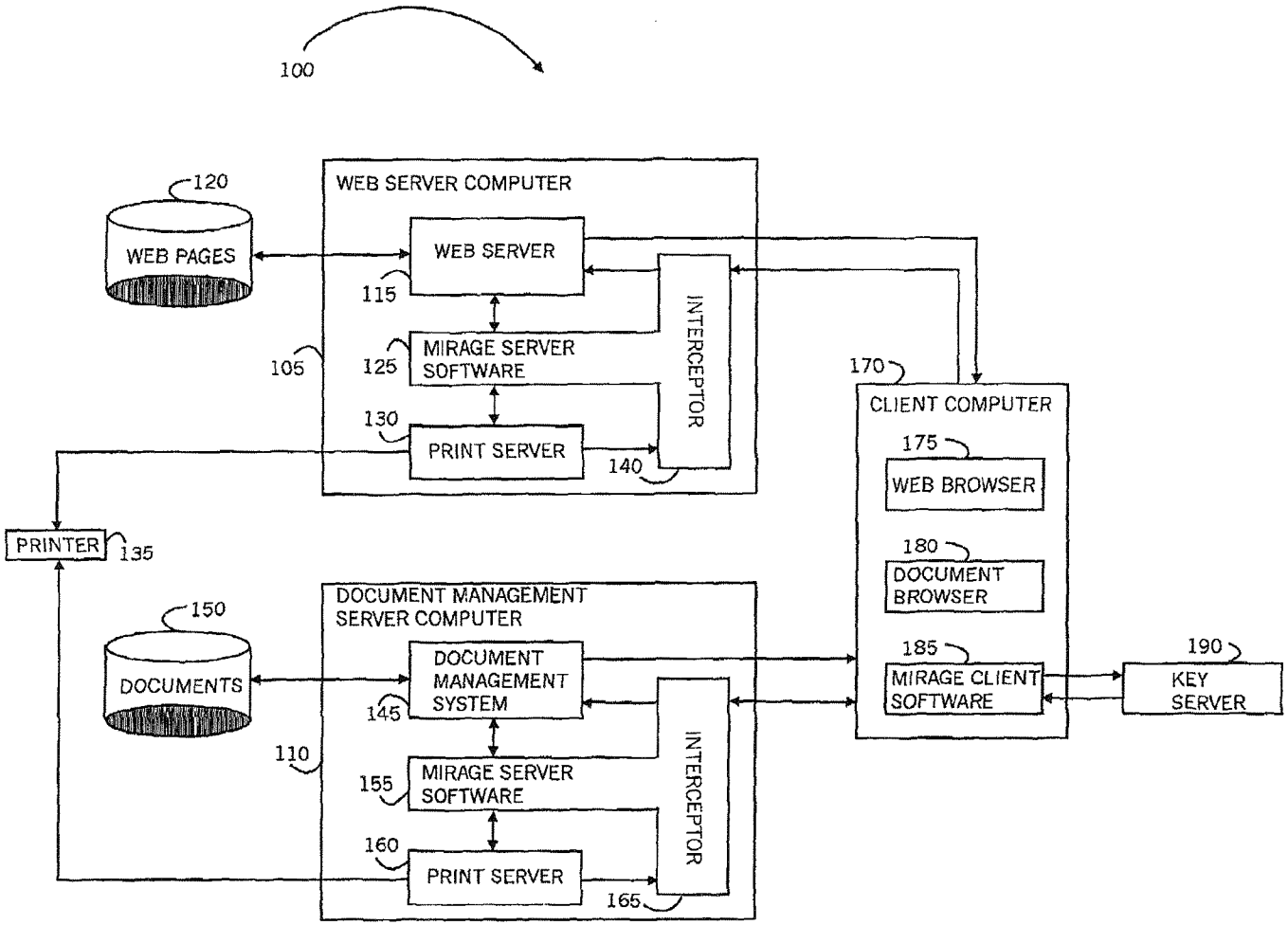
FIG. 1 is a simplified block diagram of a controlled printing system in accordance with a preferred embodiment of the present invention.

The present invention provides a method and system for printing documents within a secure content copy protection system. In a preferred embodiment, the present invention operates as a component of a "secure display" system. An example of such a system is applicant's Mirage™ enterprise software product, which is used to protect text and image content displayed on a computer monitor for viewing, from being copied. Mirage includes server-side software that encrypts content prior to delivering it to clients, and client-side software for decrypting the content prior to displaying it.

The Mirage technology is described in applicant's U.S. Pat. No. 6,298,446 entitled "Method and System for Copyright Protection of Digital Images Transmitted over Networks," in applicant's U.S. Pat. No. 6,353,892 entitled "Copy Protection of Digital Images Transmitted over Networks," in applicant's U.S. Pat. No. 6,992,693 entitled "Method and System for Copy Protection of Images Displayed on a Computer Monitor", in applicant's U.S. Pat. No. 6,993,662 entitled "Method and System for Copy Protection of Displayed Data Content", in applicant's U.S. Pat. No. 7,076,469 entitled "Copyright Protection of Digital Images Transmitted over Networks", in applicant's U.S. Pat. No. 7,155,744 entitled "Copy Protection of Digital Images Transmitter over Networks". and also in applicant's co-pending patent applications:

- U.S. Ser. No. 09/459,493 filed on Dec. 13, 1999 and entitled "Method and system for copyright protection of digital images transmitted over networks"; and
- U.S. Ser. No. 09/774,236 filed on Jan. 29, 2001 and entitled "Method and system for copy protection of data content".

Contents of U.S. Pat. Nos. 6,298,446, 6,353,892, 6,922,693, 6,993,662, 7,076,469 and 7,155,744, and the above two patent applications are hereby incorporated by reference.

In a preferred embodiment, the present invention is used to add secure printing functionality to Mirage, to complement its secure display capability. Secure printing functionality enables a user who is viewing a secure document on his display to print the document, yet does not expose to the user an unencrypted document file. In order to print the document, the user must have appropriate authorization and be able to authenticate himself. Additionally, the present invention provides the capability to dynamically watermark the document at print time. Such watermark may include, for example, a CONFIDENTIAL mark or a DO NOT DUPLICATE mark, on each page of the document that is printed, as well as print job and user information and an expiration date and/or time.

In a preferred embodiment, the present invention dynamically logs each print event, as described hereinbelow.

The Mirage system can be integrated within a web server, and used to protect HTML pages, XML pages and other web content. Mirage can also be integrated within a document management system (DMS), such as Livelink, which is a DMS developed and manufactured by Open Text Corporation of Waterloo, Canada, and Documentum, which is a DMS developed and manufactured by Documentum, Inc. of Pleasanton, Calif. Mirage enhances DMS capability by providing copy protection for displayed documents.

A DMS typically includes its own digital rights management, including permissions that require authentication. Mirage authentication preferably operates in conjunction with DMS authentication.

Mirage manages permissions using administrative rules and using a properties file. Administrative rules are typically set by an administrator, and specify paths for directories and files wherein protected content resides, and one or more rules to be associated therewith. In a preferred embodiment of the present invention, administration rules include printing attributes. If an administration rule applies to a specific document, then print attributes within the rule are used for such document. In addition, a properties file is set when Mirage is configured, and typically contains initial permission information and default permission information. In conjunction with Mirage, the DMS may add additional permission information.

In a preferred embodiment, the present invention associates print and watermark attributes with document print permissions. Each such attribute includes a space-delimited list of parameters. The print and watermark attributes are described in Table I hereinbelow, and typically are document-specific.

In a preferred embodiment, the present invention embeds an encrypted header within a document file, prior to sending the document to a client for display. The encrypted header is used inter alia to store print and watermark attributes. Preferably, the encrypted header includes the following fields:

SU (Print Server URL)—the URL of a print server. Authentication and other information can be encoded in the URL as GET data, as long as the total length of the URL does not exceed a 1024 character limit.

PD (Print POST Data)—data to be sent as POST data with a print request.

HD (Print Header Data)—data to be sent as header data with a request.

MSG (Print Message)—message to be displayed to a user if SU is empty, and thus the document is not printable.

Print attributes are collected into the encrypted header as a block denoted PRINTINFO. Thus, the encrypted header includes PRINTINFO::1, {PRINTINFO}, where PRINTINFO=SU::1, . . . [PD::1, . . . ] [HD::1, . . . ] [MSG::1, . . . ], and 1 denotes the length in bytes of the respective data segments.

In a preferred embodiment of the present invention, relevant print and watermark attributes are included within SU, PD and HD.

Preferably, the encrypted header contains a plain text block and an encrypted block. The plain text block contains inter alia a key ID, for requesting a key from a key server to decode the encrypted block. Preferably, the encrypted block contains inter alia the above PRINTINFO block of data, and also contains a key for encrypting at least a portion of the document text.

Reference is now made to FIG. 1, which is a simplified block diagram of a controlled printing system in accordance with a preferred embodiment of the present invention. The present invention can be integrated with a web server computer, such as web server computer 105, and with a document server computer, such as document management server computer 110. Web server computer 105 includes a web server 115. Web server 115 may be one of several popular web servers, such as a Netscape Internet server, a Microsoft Internet server or an Apache Internet server. Web server 115 delivers web pages to client computers. Shown in FIG. 1 is a storage 120 of web pages accessed by web server 115. Storage 120 may reside within web server computer 105, or within one or more other computers, or partly within web server computer 105 and partly within other computers.

Preferably, web server computer 105 also includes server-side software for protecting web content, such as applicant's Mirage™ server software 125. Mirage server software 125 may operate as an independent application, or in conjunction with web server 115. The operation of Mirage server software 125 is described in FIG. 2A hereinbelow.

Preferably, web server computer 105 also includes a print server 130, for serving documents to one or more printers 135, for printing. It may be appreciated by those skilled in the art that print server 130 may alternatively reside on a separate computer. The operation of print server 130 is described in FIG. 3 hereinbelow. Ina preferred embodiment of the present invention, Mirage server software 125 contains an interceptor 140, for intercepting client requests to web server 115 and routing them to Mirage server software 125.

Similarly, document management server computer 110 includes a document management system 145. Document management system 145 may be one of several popular document management systems (DMS), such as LiveLink DMS or Documentum DMS. Document management system 145 delivers documents to client computers. Shown in FIG. 1 is a storage 150 of documents accessed by document management system 145. Storage 150 may reside within document management server computer 110, or within one or more other computers, or partly within document management server computer 110 and partly within other computers.

Preferably, document management server computer 110 also includes server-side software for protecting documents, such as applicant's Mirage™ server software 155. Mirage server software 155 may operate as an independent application, or in conjunction with document management system 145. The operation of Mirage server software 155 is described in FIG. 2A hereinbelow.

Preferably, document management server computer 110 also includes a print server 160, for serving documents to one or more printers 135, for printing. It may be appreciated by those skilled in the art that print server 160 may alternatively reside on a separate computer. The operation of print server 160 is described in FIG. 3 hereinbelow. In a preferred embodiment of the present invention, document Mirage Server software 155 contains an interceptor 165, for intercepting client requests to document management system 145 and routing them to Mirage server software 155. It may be appreciated by those skilled in the art that document management system 145 may fully or partially fulfill the functionality of interceptor 165.

Also shown in FIG. 1 is a client computer 170, operated by a user. Client computer 170 includes a web browser 175. Web browser 175 may be one of several popular web browsers, such as a Netscape Navigator browser or a Microsoft Internet Explorer browser. Web browser 175 displays web pages and documents. Client computer 170 may contain a document browser 180 for displaying documents, in addition to or instead of web browser 175.

Preferably, client computer 170 also includes client-side software for protecting web content, such as applicant's Mirage™ client software 185. Mirage client software 185 may operate independently, or in conjunction with web browser 175 or in conjunction with document browser 180, or in conjunction with both web browser 175 and document browser 180. The operation of Mirage client software 185 is described in FIG. 2B hereinbelow.

In a preferred embodiment of the present invention, when client computer 170 requests a web page or a document from web server computer 105 or document management server computer 110, interceptor 140 or 165 intercepts the request and forwards the request to Mirage server software 125 or 155, respectively. In tarn, Mirage server software 125 or 155 issues a re-request for the web page or the document to web server 115 or document management system 145, respectively. The web page or the document is delivered to Mirage server software 125 or 155, and Mirage server software 125 or 155 determines if the document is printable based on one or more administration rules, properties files and HTTP headers. If the web page or document is printable, then Mirage server software 125 or 155 encrypts the web page or document, and embeds an encrypted header including print information denoted PRINTINFO, within the web page or document, respectively. The web page or document is then sent to client computer 170.

In an alternative embodiment of the present invention, the functionality of interceptor 165 may be included within document management system 145. In such an embodiment document management system 145 may be configured to automatically deliver a requested document and its print information to Mirage server software 155, to be encrypted before being returned to the user, without intervention of interceptor 165.

Upon receipt of the web page or document, Mirage client software 185 decrypts encrypted data, and securely renders the web page or document for viewing. While a user is viewing the web page or document on client computer 170, he may issue a print command. Preferably, Mirage client software 185 intercepts the print command and queries Mirage for print information included within the encrypted header that was embedded in the web page or document; specifically, within the PRINTINFO block, as described hereinabove, If print information is available, Mirage client software 185 sends such information to a print server specified in the print information, such as print server 130 or print server 160. If print information is not available, ten either the MSG message or a default message is displayed.

In a preferred embodiment of the present invention, print server 130 or print server 160 enables the user to select print options, for example, printer, page orientation and page range, and logs the user's selection. Print server 130 or print server 160 requests the web page or document from web server 115 or from document management system 145, respectively. Preferably, print server 130 or print server 160 uses authentication information within the PRINTINFO block to request the web page or document, respectively. For document printing, upon receipt of the document print server 160 determines whether the document can be printed in its native format. If the document is stored in an unsupported format, then preferably an HTML rendition is printed instead. Preferably, print server 130 and print server 160 log the print job, and send the web page or document, respectively, to printer 135.

In an alternative embodiment in which some of Mirage server software 155 is integrated within document management system 145, the print request can be recorded by document management system 145 in a consolidated DMS log.

Regarding the client-side decryption, preferably Mirage client software 185 communicates with a key server 190 to obtain a key necessary for decoding the web page or document As described hereinabove, Mirage server software 125 or 155 preferably embeds an encrypted header within the web page or document, respectively. The encrypted header contains a key ID, to request a key from key server 190 for decoding the encrypted header. Preferably, the encrypted header includes an encrypted key for encrypting at least a portion of the web page or document. Thus the key obtained from key server 190 enables Mirage client software 185 to extract another key for decoding at least a portion of the web page or document.

In an alternative embodiment of the present invention, the encrypted PRINTINFO is sent by client computer 170 to key server 190 for decryption. In this embodiment, Mirage client software 185 does not decrypt the print information. Instead, key server 190 decides whether to decrypt the print information it receives from client computer 170, and send decrypted information back to the client, or whether to send updated print information to the client, or whether to decline to decrypt the print information altogether.

Figure 2A:
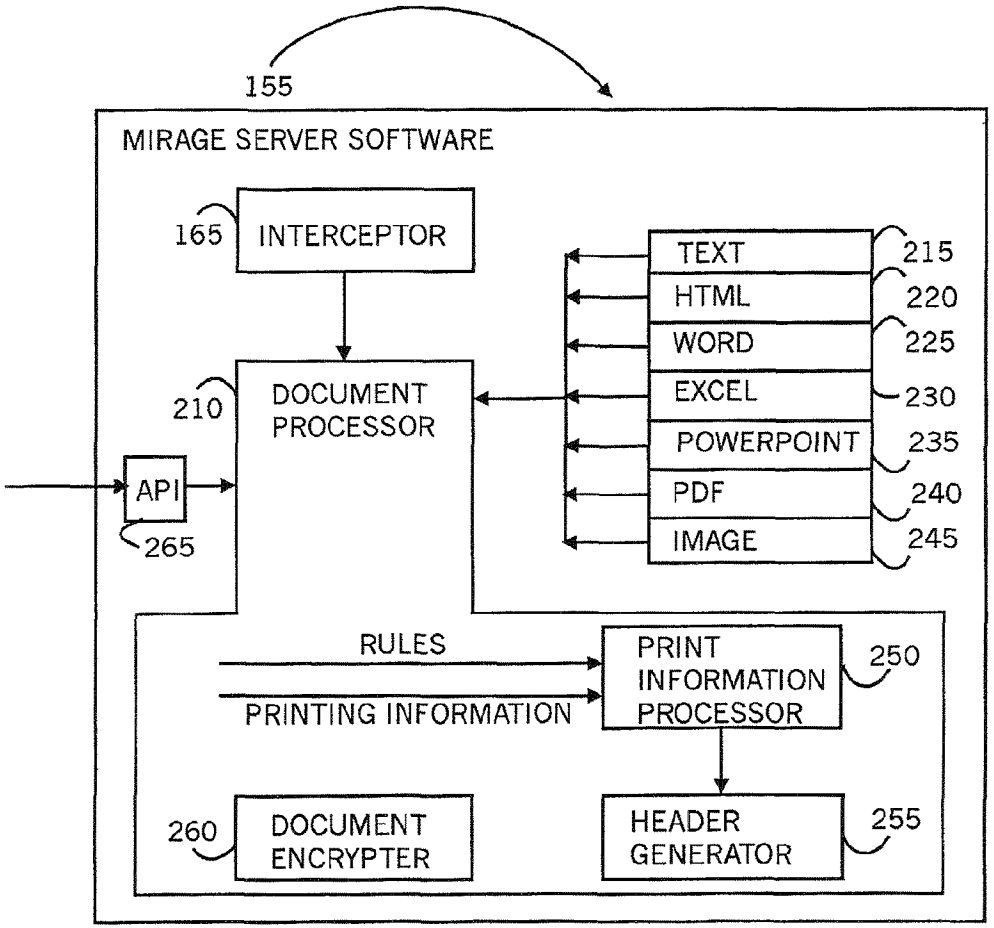
FIG. 2A is a simplified block diagram of a server-side component of a system for controlled printing, in accordance with a preferred embodiment of the present invention.

Reference is now made to FIG. 2A, which is a simplified block diagram of a server-side component of a system for controlled printing, in accordance with a preferred embodiment of the present invention. Shown in FIG. 2A is Mirage server software 155 from FIG. 1. Mirage server software 155 includes interceptor 165 for intercepting document requests for a document server. Mirage server software also includes a document processor 210 and individual components 215, 220, 225, 230, 235 and 240 for processing text, HTML, Word, Excel, PowerPoint and PDF documents, respectively, and a component 245 for processing images. It is apparent to those skilled in the art that components for processing other types of documents may be included in addition to components 215-245, and that some or all of components 215-245 may not be included, depending on the types of documents chosen to be supported. Document processor 210 preferably includes a print information processor 250, and a header generator 255 for embedding administration rules and print information within a document.

Print information processor 250 preferably processes (i) print information included within a document processor configuration file, (ii) administration rule data intercepted by interceptor 165, and (iii) HTTP header data within the web server or DMS re-request response. Print information processor 250 also formats the printing information for inclusion within a document header. It is noted that the print information is encrypted, so that only trusted print servers can decrypt it.

In a preferred embodiment of the present invention print information processor 250 is implemented as a separate module or class or API. This is done so as to simplify customization for different DMSs. DMSs may require different HTTP headings or special encoding for data needed to request an authenticated printable version of a document, web page, ASP page or CGI-generated page.

Finally, document processor 210 also includes a document encrypter 260, and an application programming interface (API) 265 for communicating with document processor 210.

Figure 2B:
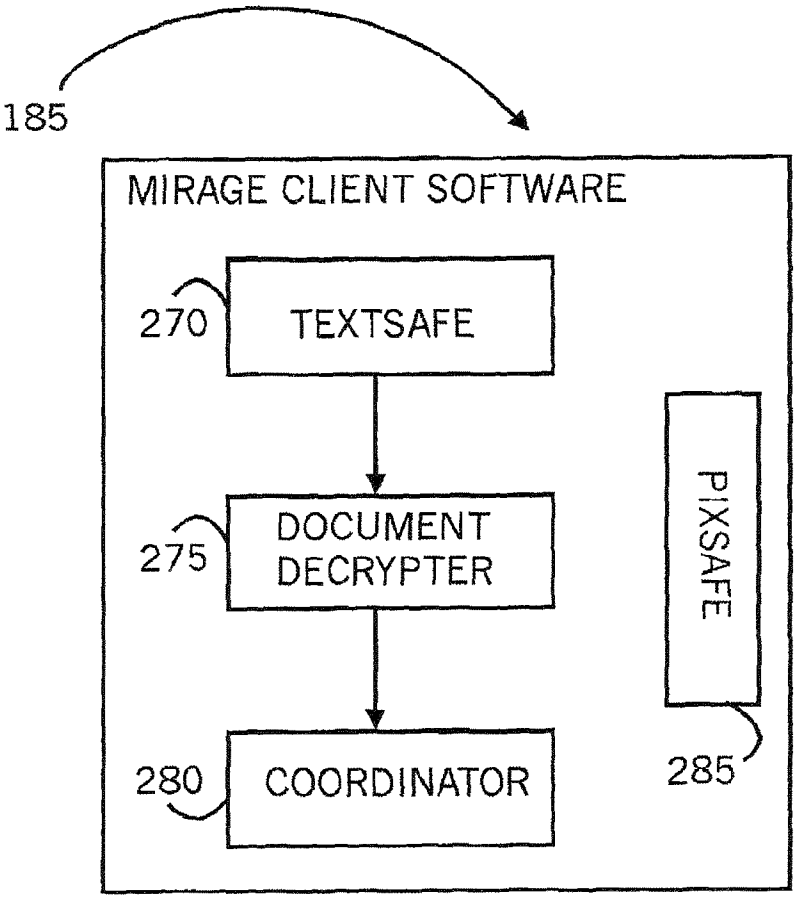
FIG. 2B is a simplified block diagram of a client-side component of a system for controlled printing, in accordance with a preferred embodiment of the present invention.

Reference is now made to FIG. 2B, which is a simplified block diagram of a client-side component of a system for controlled printing, in accordance with a preferred embodiment of the present invention. Shown in FIG. 2B is Mirage client software 185 from FIG. 1. Mirage client software 185 includes a TextSafe module 270, which intercepts text rendering by web browser 175. Mirage client software 185 preferably also includes a document decrypter 275 and a coordinator 280.

Upon issuance of a command by client computer 170 to view a secure document, TextSafe module 270 intercepts encrypted text as it is being rendered, and calls document decrypter 275 to decrypt the intercepted text. TextSafe inserts the decrypted text into a video frame buffer for secure display. Coordinator 280 is responsible for communication with a key server and with print server 160 (FIG. 1). Coordinator 280 is preferably also responsible for caching of keys and encrypted headers.

A PixSafe module 285 is used to provide secure display service by protecting displayed content from screen capture. PixSafe module 285 operates by patching system graphics display interface (GDI) functions, including inter alia Microsoft Windows' BitBlt and StretchBlt functions, as described in U.S. Pat. Nos. 6,298,446 and 6,353,892.

Upon issuance of a print command by client computer 170 to print a secure document, TextSafe module 270 intercepts a print event and forwards it to document decrypter 275. Document decrypter 275 analyzes print information within the PRINTINFO block and determines a corresponding action.

Specifically, document decrypter 275 determines whether (i) to display a default error message; (ii) to display the MSG message; or (iii) to initiate a print request. Coordinator 280 then performs the action.

Figure 3A:
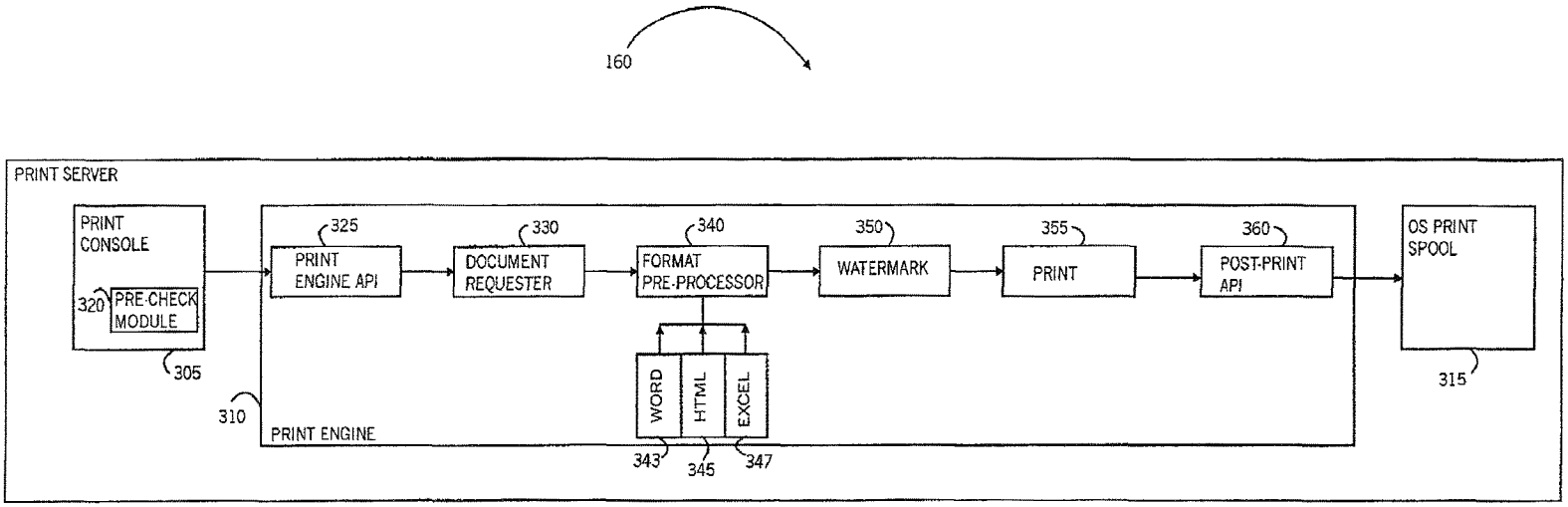
FIG. 3A is a simplified block diagram of a print server for controlled printing, in accordance with a preferred embodiment of the present invention.

Reference is now made to FIG. 3A, which is a simplified block diagram of a print server for controlled printing, in accordance with a preferred embodiment of the present invention. Shown in FIG. 3A is printer server 160 from FIG. 1. Print server 160 includes two core modules: a print console 305 and a print engine 310. Print console 305 is a public interface of print server 160. Preferably, client communications go through print console 305. Print console 305 preferably accepts print requests and presents a user with a print options interface. In a preferred embodiment of the present invention, a jsp (Java server page) is used in conjunction with a servlet for the print options dialogue.

After print options have been selected, print console 305 preferably passes the information to print engine 310. In a preferred embodiment of the present invention, print engine 310 requests a document from a specified location, via Mirage server software 155, watermarks the document as required, and prints the document to a printer spool 315.

Print console 305 is responsible for receiving print requests generated by a client computer and sent via coordinator 280. Preferably, the client computer includes print information associated with the document in its request. Such print information is generated by a document processor, such as document processor 210 (FIG. 2A), and is preferably encrypted and embedded within a document currently being viewed, as described hereinabove. Preferably, only print console 305 can decode print information generated by document processor 210. In a preferred embodiment of the present invention, print console 305 is a Java servelet.

In a preferred embodiment of the present invention, a print console properties file contains the following configuration information:

Default watermarking options
List of available printers, and each printer's properties
List of native document formats supported by print engine 310

In an alternate embodiment of the present invention, print console 305 may receive default print settings from an administration module.

Preferably, when print console 305 receives print information, it analyzes the print attributes together with data in the properties file, and appropriately populates fields in the .jsp print options page. The generated .jsp page is sent back to a user, who can then set print options within a form.

Figure 3B:
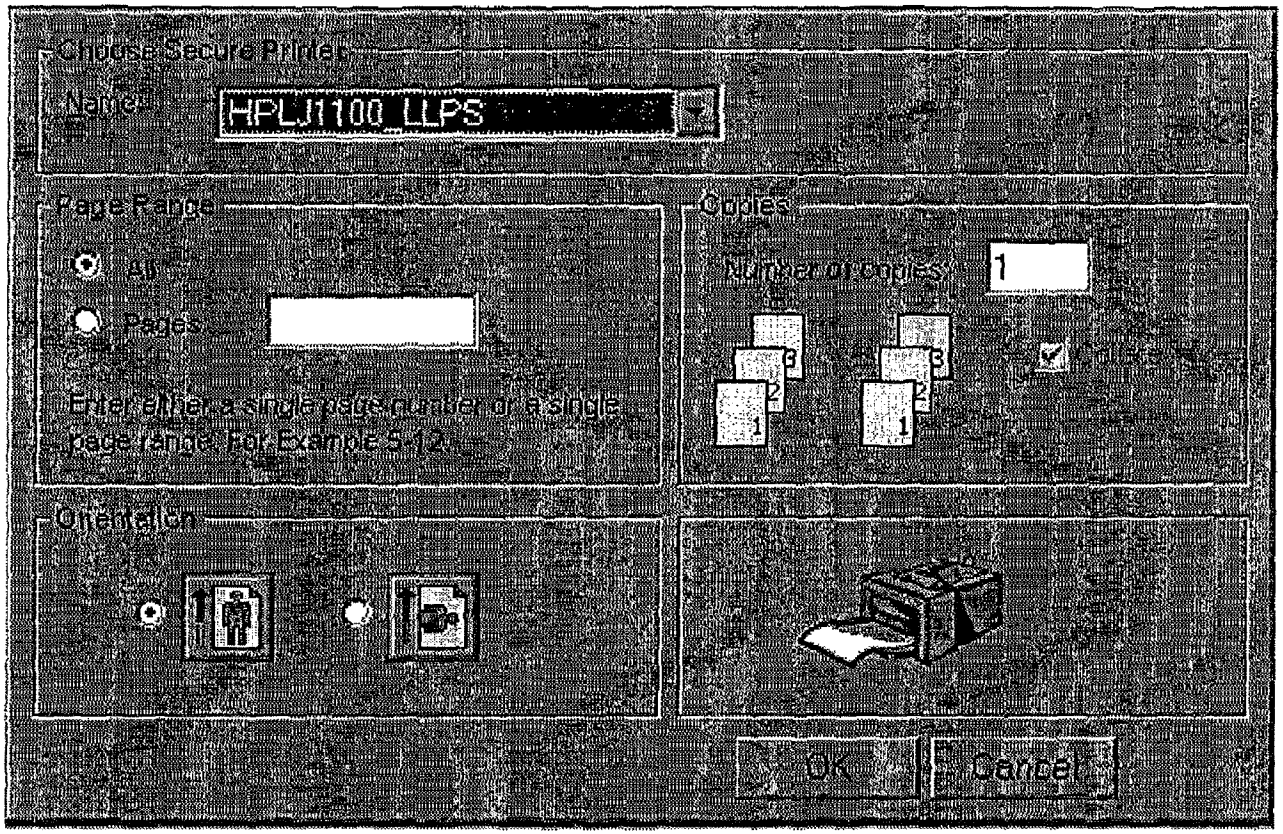
FIG. 3B is a user interface with a sample print options dialogue, in accordance with a preferred embodiment of the present invention.

The user selects print options and clicks on "OK." Print options may include inter alia:

Page orientation
Printer
Page range
Color/Black & white
Duplex/Multi-page
Other print options A user interface with a sample print options dialogue, in accordance with a preferred embodiment of the present invention, is illustrated in FIG. 3B.

The print option data filled in by the user is then submitted by the form back to print console 305. Print console 305 processes the data and calls print engine 310 to print the document. When print engine 310 finishes, it returns a value to print console 305, which preferably sends back an HTML page informing the user of the outcome.

Print console 305 includes a pre-check module 320, which is an API that print console 305 calls after receiving a request. Print console calls pre-check module 320 with print information, and pre-check module returns updated print information. Pre-check module 320 enables software integrators to dynamically pre-process print information at run-time, before it is acted upon. As only the updated print information is acted upon, it may be appreciated that pre-check module 320 enables software integrators to:

Perform a check with a hack-end system before showing the user the print options dialogue
Perform pre-print logging
Implement digital rights management (DRM) technology
Perform additional authentication
Customize print options according to a specific user, such as by filtering a list of printers As such, it may be appreciated that pre-check module 320 may be used to change print properties and permissions at print time. Pre-check module 320 may also be used to ensure that a latest version of a document is printed, in conformance with the Food and Drug Administration (FDA) Office of Regulatory Affairs guidelines for electronic records and electronic signatures, relating to document versioning. These guidelines are described in Title 21 of the Code of Federal Regulations (21 CFR Part 11), available on the Internet at http://www.fda.gov/ora/compliance_ref/part11/.

Similarly, pre-check module 320 may also be used to control how a document may be printed, through print options that it enables or disables. Pre-check module 320 may also be used to enforce DRM rules, including how many times a document may be printed, and when a document may be printed.

Print engine 310 preferably includes a print engine API 325 that can only be called by print console 305 or by a third party that desires to implement its own print console, such as a document management system provider. Preferably, the print engine API 325 cannot be called directly by users. Print engine 310 includes a document requester 330, for requesting a document from database management server computer 110 (FIG. 1) to be printed.

Print engine 310 also includes a format pre-processor 340 for converting various document formats into an internal format. Various pre-processing units feed into format pre-processor 340. Shown in FIG. 3 are units 343, 345 and 347 for processing Word documents, HTML documents and Excel documents, respectively. Following format pre-processor 340, documents are passed to a watermark processor 350 for optional watermarking.

It may be appreciated that watermark processor 350 enables dynamic processing of watermarks at run-time. Watermark processor 350 also enables application of usage policies. For example, a watermark "Document valid Until . . . " may be added at run-time. As such, watermark processor 350 can be used to comply with 21 CFR part 11, mentioned hereinabove.

Following watermark processor 350 documents are passed to a print processor 355, for generating a print command and delivering content to print spool 315. As content is being delivered to print spool 315, a post-print API module 360 is used for last-minute dynamic updating of print permission.

Implementation Details

In a preferred embodiment of the present invention, a controlled printing process includes three phases, as follows:

Phase I—Document Preparation:

When processing a document, information that the client will need to send to the print engine is included. Such information is either provided as one or more default parameters in a configuration file, or as part of an administration rule, or provided by a back-end web server, such as web server 115

(FIG. 1) or a back-end DMS such as DMS 130 (FIG. 1) when returning a document to be processed.

Figure 4:
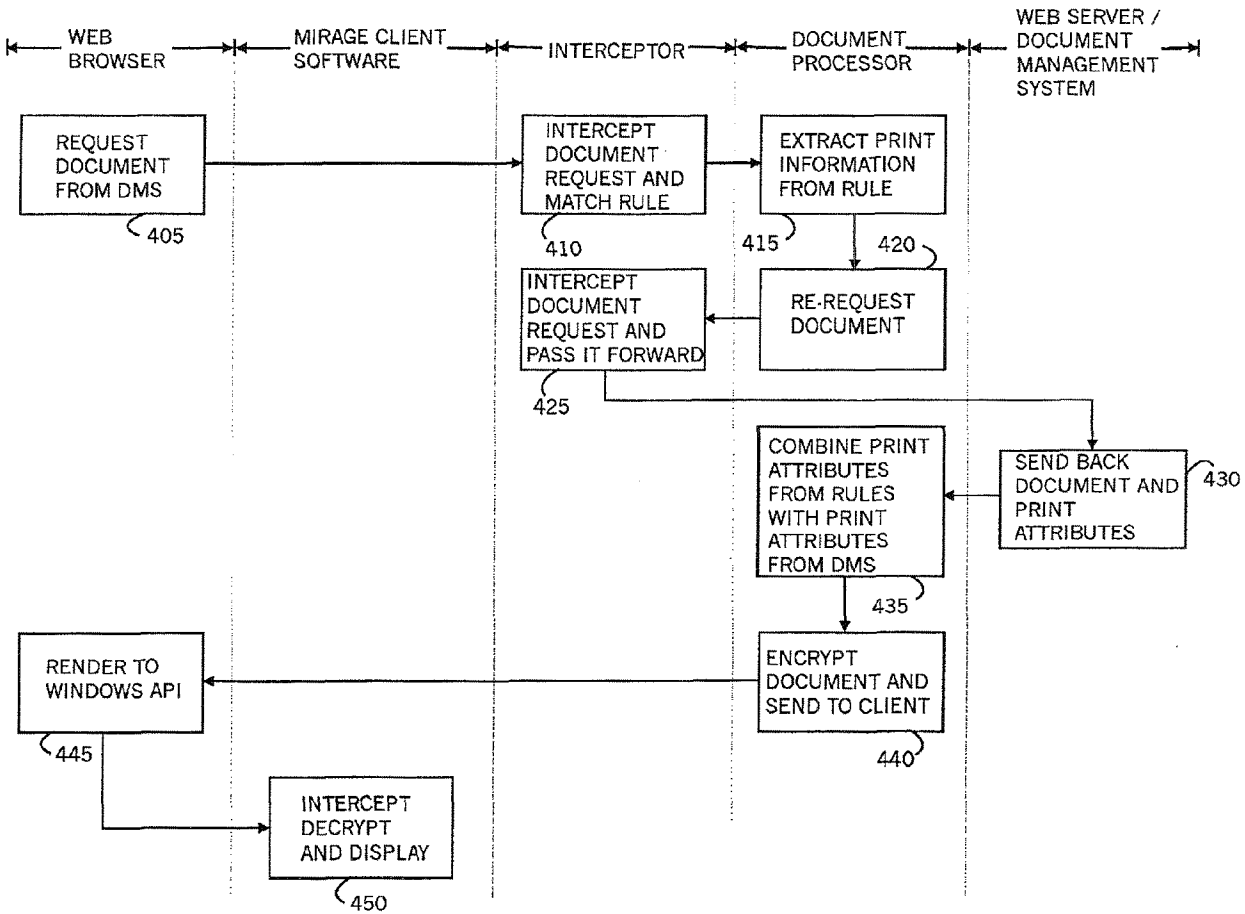
FIG. 4 is a simplified flowchart for document preparation within a copy protection application, in accordance with a preferred embodiment of the present invention.

Reference is now made to FIG. 4, which is a simplified flowchart for document preparation within a copy protection application, in accordance with a preferred embodiment of the present invention. At step 405 a web browser requests a document from a document server computer. At step 410 the request is intercepted by an interceptor component within Mirage server-side software. The interceptor matches the request against administration rules, which preferably include printing attributes. The interceptor re-directs the request to a document processor, passing it a matching rule ID.

At step 415 the document processor extracts print information from the rule. At step 420 the document processor re-requests the document, passing a document URL and print attributes. In a preferred embodiment of the present invention, the print attributes may include a SUPPORTED attribute, indicating that printing is supported. Preferably, the document processor also sets a CKSM_SEED to allow authentication of DMS print attributes. Preferably, a configuration file is used to determine if attributes are to be checksummed.

When the document processor re-requests the document at step 420, the back-end system may return print attributes in its response. Such attributes supplement the print information already obtained through the document processor's properties file and the administration rules. Preferably, the DMS uses the print attributes to provide a print server with sufficient information to make an authorized request for the document at print time.

At step 425 the interceptor again intercepts the document request, as was done at step 410, but this time the interceptor preferably forwards the request along to the document management system. At step 430 the web server or DMS sends back the requested document. The DMS may also send print attributes in response to the print attributes received from the document processor. In a preferred embodiment of the present invention, depending on the value of ALLOW, the DMS decides whether or not to return print attributes at in its response If CKSM_SEED is set, the DMS checksums its print attributes. The DMS preferably includes information required by a print engine so as to make an authorized request for a native version of the current document at print time, If supported, the DMS may also include data that enables it to authenticate and authorize a user's print permission For example, this may be a one time token to be used for printing. In a preferred embodiment of the present invention, the DMS sends its print attributes within print headers or, more generally, as document meta-data.

At step 435 the document processor receives a document. In a preferred embodiment of the present invention, the document processor combines the print attributes from the administration rule with the print attributes in the response from the DMS, and embeds them into an encrypted header. At step 440 the document processor encrypts the document and sends it to the web browser for viewing. At step 445 the web browser renders the encrypted document to a Windows API. At step 450 the Mirage client software intercepts the rendering, decrypts encrypted data and displays it securely.

Phase II—Client-Side Trigger:

A user generally prints by clicking on a print icon in an application's toolbar or within a print preview window, by a mouse right-click and print, by using a CRTL+P shortcut, or by choosing File|Print. Additionally, printing can be requested within JavaScript or within a COM object, or via dynamic data exchange (DDE).

When the present invention is operative, a protected document is typically encrypted within applications. Thus, if an application were to print such document without the intervention of document processor 210 (FIG. 2A), only encrypted data is printed.

In a preferred embodiment of the present invention, a user's attempt to print normally is intercepted by interceptor 165 (FIG. 1), and printing is initiated within Mirage server software 155. Following Phase I (Document Preparation) information necessary to initiate printing of a document by Mirage server software 155 is already encoded within a document header.

The header of a document to be printed is queried for print information. If such information is available, it is sent to a print server, such as print server 160.

Figure 5:
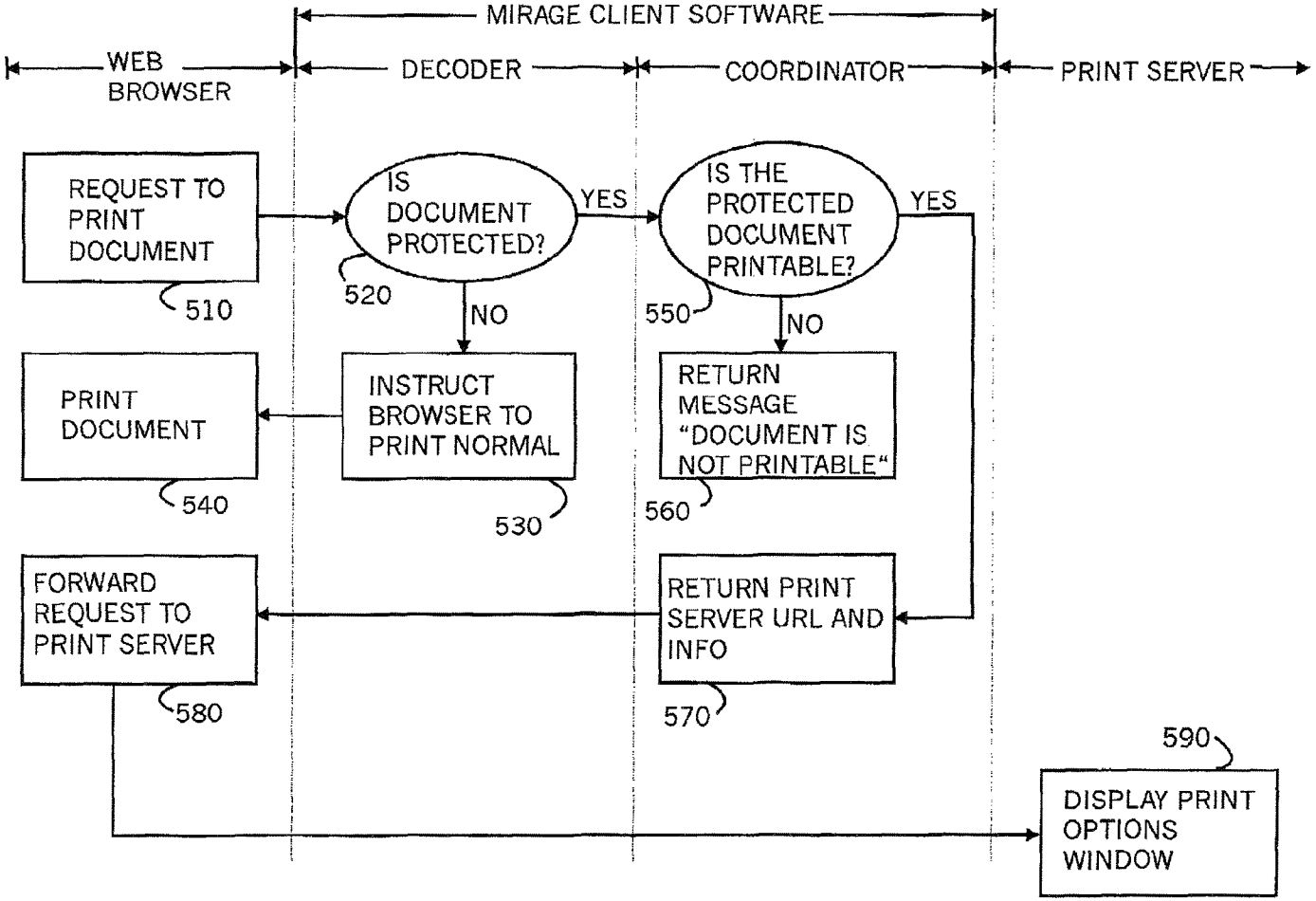
FIG. 5 is a simplified flowchart for a controlled print process, in accordance with a preferred embodiment of the present invention.

When the header is queried, thee possibilities can arise; namely, (i) the document is not protected, (ii) the document is protected but not printable, and (iii) the document is protected and printable. Reference is now made to FIG. 5, which is a simplified flowchart for a controlled print process, in accordance with a preferred embodiment of the present invention. A user tries to print, and at step 510 a web browser accordingly issues a request to print a document. At step 520 Text-Safe module 270 (FIG. 2B) of Mirage client software 185 intercepts the print request, and document decrypter module 275 of Mirage client software 185 is used to determine whether or not the document is protected. If not—for example, if the document does not have an encrypted header, then at step 530 Mirage client software 185 instructs the browser to process the print request in the normal fashion, and at step 540 the browser prints the document.

If document decrypter 275 determines at step 520 that the document is protected, then at step 550 document decrypter 275 determines if the protected document is printable. If, for example, the protected document does not include print information in its encrypted header, or if the encrypted header is not decryptable—such as for lack of an available key, or if a print server URL (SU) field has a zero size, then the document is not printable. At step 560 a message is returned to the user, preferably using a MSG field in the document header, informing the user that the document is not printable.

If she document decrypter 275 determines at step 550 that the protected document is printable, then the print request is forwarded to coordinator module 280 of Mirage client software 185. Thereafter the web server authenticates the user and presents to the user a print options dialogue generated by print console 305 (FIG. 3 A). If the user is authenticated, then at step 570 print server URL and print information (PRINTINFO) is provided to the print dialogue. In a preferred embodiment of the present invention, the print dialogue is a browser control, although this is not necessary. At step 580 the web browser forwards the print request to a print server designated by a SU, and at step 590 the print server preferably enables the user to select print options.

It is noted that the in a preferred embodiment of the present invention, the process of FIG. 5 is performed at the client side. This is advantageous for catching print operations as early as possible.

Figure 6:
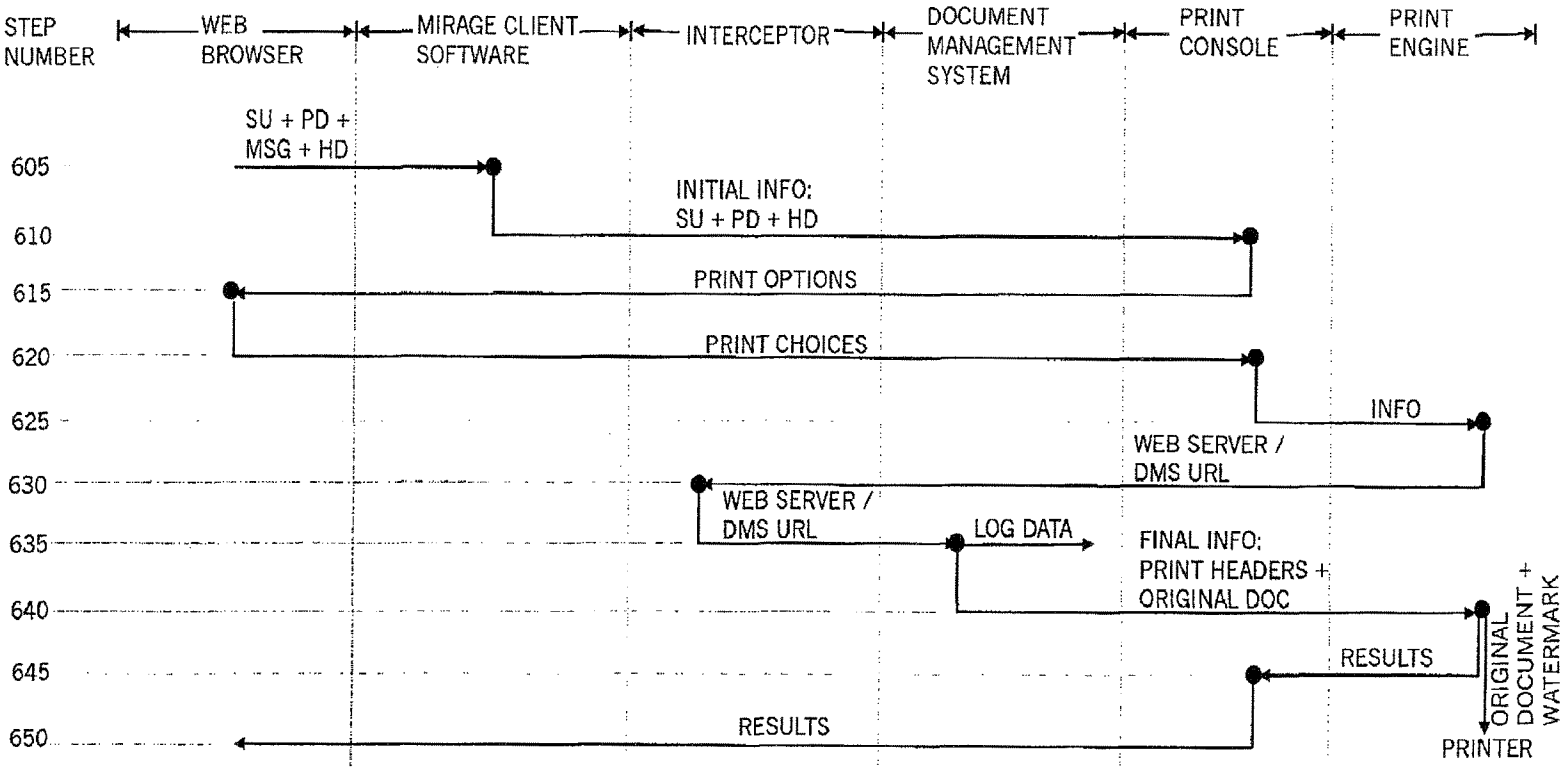
FIG. 6 is a simplified data sequence diagram for an authentication and secure print workflow, in accordance with a preferred embodiment of the present invention.

Phase III—Server-Side Printing:

Reference is now made to FIG. 6, which is a simplified data sequence diagram for an authentication and secure print workflow, in accordance with a preferred embodiment of the present invention.

Preferably, sufficient print information (PRINTINFO) is provided in Phase I so that when the client sends printing instructions in Phase II, the print server has sufficient information to request the document and allow the back-end system to authorize the user's request to print the document. In a preferred embodiment of the present invention, PRINTINFO includes inter alia the SU and the document URL.

In the last step of Phase II (Client-Side Trigger); namely, step 590 (FIG. 5), coordinator 280 (FIG. 2B) opens a browser window to the print server URL (SU). If there was data in the encrypted header Print POST Data (PD) field, this is also sent as POST data. Additionally, there may be parametrized data in the SU and HD.

Preferably, the SU points to print console 305 (FIG. 3A), which is a Java servlet. Print console 305 decodes data in the SU and header POST buffer, and recreates the print information, PRINTINFO. Print console 305 calls pre-check module 320, passing in PRINTINFO. Pre-check module 320 allows print console 305 to:

Check against the DMS if the user has permission to print the document

Check that the document is available and the correct version

Check digital rights management rules

Check status of the user

Get a list of printers and their properties for the user

Log the begin of the print process and the print options

If the user is permitted to print the document, PRINTINFO is preferably saved in a current connection session. Print console 305 preferably decides if either the native or HTML version of the document should be printed. Using its internal list of printers and other print information obtained from pre-check module 320, print console 305 uses a .jsp page to generate an HTML form that allows the user to select print options. The .jsp page is sent back to the user.

Print console 305 receives the user's print settings. Print console 305 uses the user's print settings to pass appropriate PRINTINFO data to print engine 310, for printing the document.

The print engine's document requester 330 requests the document from a document management system, such as DMS 145 (FIG. 1). Preferably, included in the request are cookies, and headers that the DMS specified when the document was requested for viewing. Such information allows print engine 310 to request the document for printing, assuming that the DMS has not since revoked the user's permission to print the specified document. Print engine 310 also sends print attributes allowing the DMS to choose final print options and set watermark properties. Preferably, the DMS logs the print request for the user.

Print engine 310 receives the document and resolves the watermark data, and tries to print the document. If necessary, print engine 310 calls an external watermark engine to generate a watermark image, according to watermark values. Print engine 310 returns the results to print console 305, which in turn sends hack an HTML page advising the user whether or not the job was successful.

Print and Watermark Attributes

In a preferred embodiment of the present invention, print and watermark attributes are sent to the recipient either as HTTP header values, or as metadata within a document. Table I hereinbelow indicates a specific set of print attributes used in a preferred embodiment of the present invention. Preferably, all values are URL-encoded.

TABLE I

Print Attributes

| Header Name | Values | Description & Notes |
|---|---|---|
| ALLOW | "YES" \| "NO" | Default is "No". The last value received is the one that should be used. |
| The following parameters are only processed after the Document Processor does a document re-request. These parameters are used by the print server for re-requesting the document for serving. | | |
| H_GENERAL | {Encoded array of headers} | Headers common to both native and HTML requests. Will be overridden, if specified again in the format specific headers, (DP re-request only.) |
| U_HTML | {URL} | The URL of the HTML version of this document. Normally will be the URL currently processed. (DP re-request only.) |
| H_HTML | {Encoded array of headers} | Any special headers/cookies needed to request the HTML version. (DP re-request only.) |
| U_NATIVE | {URL} | The URL of the native version. |
| H_NATIVE | {Encoded array of headers} | Any special headers/cookies needed to request the native version. (DP re-request only.) |
| M_NATIVE | {MIME TYPE} \| {file extension} | Used by the print engine to determine if it can print the native version, otherwise it will print HTML version. (DP re-request only. |
| The following parameters are processed by the Document Processor and again by the Print Server when the document is re-requested. | | |
| WMRK | "YES" \| "NO" | Default is "No". The last value received is the one that should be used. |
| WMRK_H | {space delimited list of watermark types} | Watermark parameters for the document header. Will be displayed in order specified. See Table II. |
| WMRK_F | {space delimited list of watermark types} | Watermark parameters for the document footer. Will be displayed in order specified. See Table II. |
| WMRK_B | {space delimited list of watermark types} | Watermark parameters for the document body. Will be displayed in order specified. See Table II. |
| WMRK_P | {space delimited list of watermark types} | The current list of parameters that will be used. |
| The following parameters are for security, to ensure that the data source is valid. | | |
| CKSM | 128-bit value | Can only be returned in a HTTP header and not in document Meta Data. |
| CKSM_SEED | 128-bit value | Cannot appear in a response, only a request. |
| ALLOW | "YES" \| "NO" | Default is "No". The last value received is the one that should be used. |
| The following parameter enables bypass of default print server and use of another print server instead. | | |
| SU2 | {URL} | Only for DMS. Overrides SU value. |
| PD2 | Byte data | Only for DMS. Overrides PD value. |
| PH2 | Header | Only for DMS. Overrides HD value. |
| MSG2 | String | If specified at document re-request time, will be used for MSG value. If used at print-request time, then used in results page. Binary values (e.g., \r\n) should be escaped. |

As can be seen from Table I, print attributes generally fall into two sets. The first set includes attributes used by the print server to determine how to print. Such parameters preferably allow the print server to decide whether it wants to print the native version of the document, when available, or alternatively to print an HTML version, when available. The first set of attributes includes U_HTML, U_NATIVE, M_GENERAL, H_HTML, H_NATIVE, and M_NATIVE. Preferably, these attributes are only processed by the document processor after the re-request of the document from the DMS. If the native format of the document is available, then preferably the U_NATIVE and M_NATIVE attributes are defmed and sent. The M_NATIVE attributes enable the print server to decide if it can print a specific format. Otherwise, if the U_HTML attribute is defmed, the HTML version can be printed.

The second set of print attributes are used to aid the back-end DMS to re-authenticate the print server and user when requesting the document for printing. Using H_GENERAL, the DMS can insert any headers that it needs to authenticate and authorize either the users or print servers to access the document. Preferably, H_GENERAL holds common headers. If specific headers are needed for the native or HTML version, they are preferably set using H_NATIVE and H_HTML, respectively.

The present invention also enables the DMS to use its own print server. In such a case, the DMS can override the print server URL (SU) by specifying SU2. Typically, SU2 is specified in the document processor's configuration or properties file. SU2 is encoded in the encrypted header as SU, which is the URL that the coordinator calls when attempting to print. Authentication information is preferably encoded in SU as a GET string.

If a DMS specifies its own print server, it can also set PD2, which overrides other data set by the document processor when processing the attributes. The PD2 attributes are preferably included in the encrypted header as a PD field. PD2 is preferably sent as POST data when the coordinator calls SU2. If SU2 together with the GET data exceeds a 1024 character limit, then the data is preferably included in PD2 rather than SU2.

In an alternate embodiment of the present invention, an API for the DMS is created, and sent a URL including a server IP and port number, a document ID and a username. In addition, a special account is created within the DMS that the print server can log into and impersonate a user and request a document in the user's name. For such an embodiment it is only necessary to send the URL.

Table II hereinbelow indicates a specific set of watermark attributes used in a preferred embodiment of the present invention. Preferably, all values are URL-encoded, and watermark attributes are not sent without a CKSM, if CKSM SEED was sent in the request.

TABLE II

| Watermark Attributes | | |
|---|---|---|
| Header Name | Values | Description |
| STRING | String | User defined string |
| USERNAME | String | Username |
| PRINT_DATETIME | String | Time of printing |
| CLIENT_IP | String | Address of client machine |
| DOCUMENT_NAME | String | Document Name/URL/ID |

In a preferred embodiment of the present invention, watermarking parameters are either specified when the document is requested in Phase I, or when it is requested for printing in Phase III. Watermarking occurs if SUPPORT is set and WMRK is YES. The attribute WMRK is preferably sent both at document request and document print request.

The attributes WMRK_B, WMRK_F, and WMRK_H are preferably set by the DMS if watermarking is enabled. These attributes specify a watermark format for the body, footer and header, respectively. Each of these attributes takes a space-delimited list of watermark types, as specified in Table II. Default values are typically specified in the document processor's properties file.

During Phase I and Phase m, the attribute WMRK_P is preferably sent with the request. The DMS can specify a value for either of these attributes, and for others as well, by including in the header a parameter name and value. If the DMS specifies WMRK_B, WMRK_F, and WMRK_H, then preferably it should also set values for any new watermark parameters and for parameters specified in WMRK_P. The DMS can either set parameter values in Phase I or Phase III. There is no need in Phase III to send back an updated WMRK_P. If the print server is unable to calculate a value for a required watermark parameter, it does not include it in the watermark.

During Phase I and Phase III, the attribute WMRK_P is preferably sent with the request. The DMS can specify a value for either of these attributes, and for other as well, by including in the header a parameter name and value. If the DMS specifies WMRK_B, WMRK_F, and WMRK_H then preferably it should also set values for any new watermark parameters and for parameters specified in WMRK_P. The DMS can either set parameter values in Phase I or Phase III. There is no need in Phase III to send back an updated WMRK_P. If the print server is unable to calculate a value for a required watermark parameter, it does not include it in the watermark.

Figure 7:
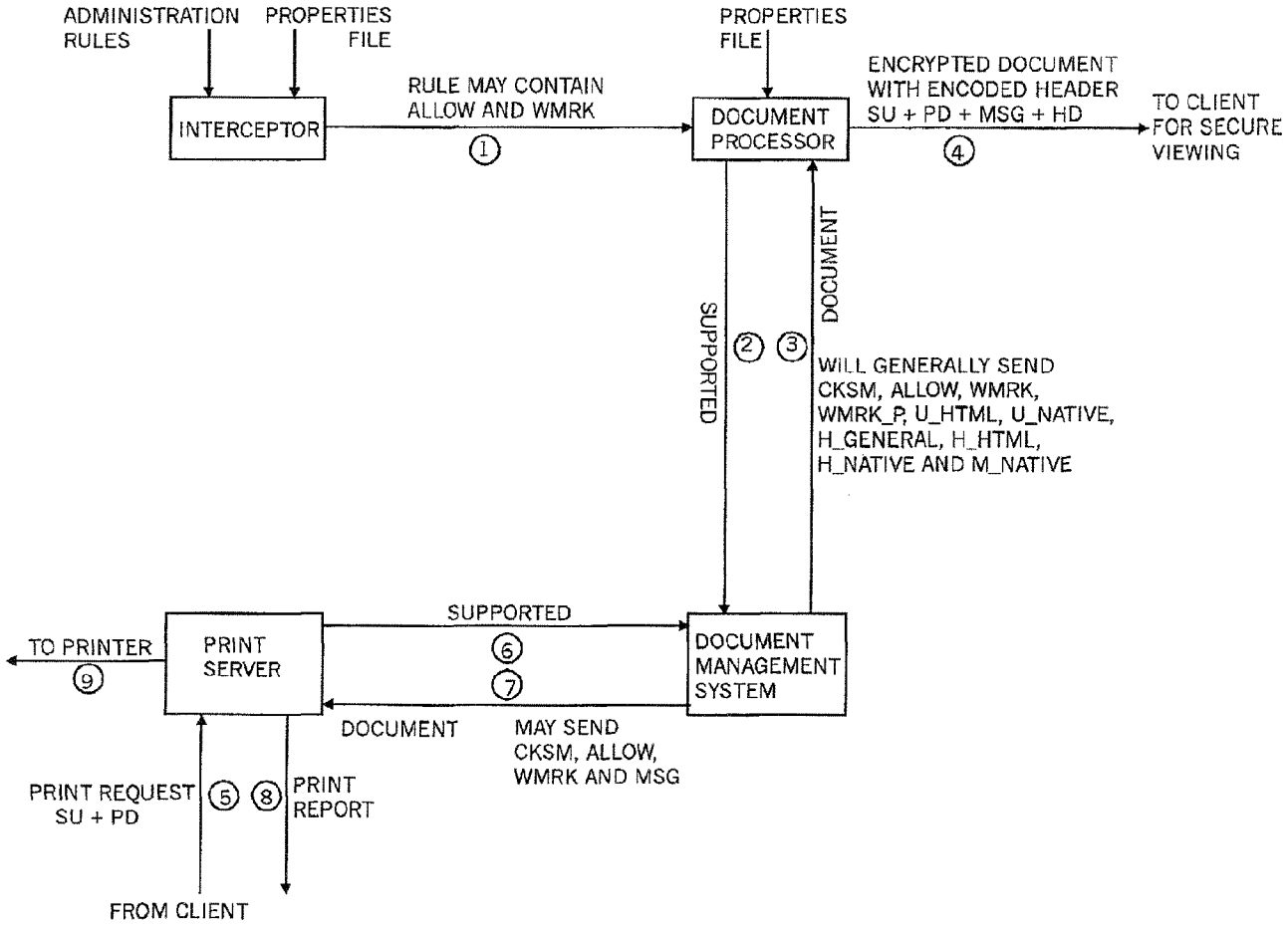
FIG. 7 is a simplified data flow diagram for setting print and watermark attributes for a document, in accordance with a preferred embodiment of the present invention.

Reference is now made to FIG. 7, which is a simplified data flow diagram for setting print and watermark attributes for a document, in accordance with a preferred embodiment of the present invention. FIG. 7 illustrates how print and watermark attributes are provided from several different sources, including document processor 210 (FIG. 2A), interceptor 165 (FIG. 1), DMS 145 and print server 160. As shown in FIG. 7, at step 1 the interceptor ascertains print and watermark attributes from a properties file and from administrative rules. The rules may contain the attributes ALLOW and WMRK. Such print and watermark attributes are sent to the document processor.

At step 2, the document processor preferably sends the attribute SUPPORTED to the document management system. At step 3, the document management system generally sends the ten attributes CKSM, ALLOW, WMRK, WMRK_P, U_HTML, U_NATIVE, H_GENERAL, H_HTML, H_NATIVE and M_NATIVE.

At step 4, the document processor generates an encoded header including the print server URL (SU), print POST data (PD), header data (HD) and a print message (MSG). Preferably, the latter parameters are optional. The encoded header is embedded within the document, and the document is then sent to a client for secure viewing. Mirage client software at the client decrypts the encoded header and then decrypts the document for display.

The client subsequently issues a print request and, at step 5, the print request is sent to the print server along with the SU, PD and HD. At step 6, the print server requests the document from the document management system. The print server preferably sends the attribute SUPPORTED.

At step 7, the document management system sends the requested document to the print server. The document management system may send the four attributes CKSM, ALLOW, WMRK, and MSG.

After receiving the document, the print server prints it on a designated printer and, at step 8, issues a print report with MSG to the client.

In a preferred embodiment of the present invention, the print and watermark attributes sent at steps 1, 2, 3, 5, 6 and 7 are sent as HTTP headers. The encoded header sent at step 4 is embedded within the document itself.

Preferably, the present invention imposes rules for order of processing attributes. Specific rules used in Mirage are as follows. Print and watermark attributes are processed in the order (i) document processor properties files; (ii) interceptor and administration rule attributes; and (iii) web server/DMS attributes. Relative to this order, the latter value specified for an attribute is used, overriding previous values, except for ALLOW and WMRK. Regarding ALLOW and WMRK, latter values of these attributes must complement and include previous values at their beginnings, or else they are ignored.

Additional Considerations

In reading the above description, persons skilled in the art will realize that there are many apparent variations that can be applied to the methods and systems described.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than in a restrictive sense.

What is claimed is:

1. A method for secure printing, comprising:

providing a document management system (DMS) that stores and retrieves a plurality of documents, wherein at least a portion of the documents require authentication information for access, and have DMS print restrictions associated therewith;

providing a web-based capture protection system that prevents proprietary content displayed on a display device from being screen-captured, wherein such proprietary content has web-based print restrictions which limit its being printed;

intercepting a retrieval request from a client computer, to retrieve a designated document from the DMS;

deriving combined print restrictions for the designated document by combining (1) the DMS print restrictions associated with the designated document and (2) the web-based print restrictions to restrict printing of proprietary content contained in the designated document;

encrypting the designated document using a document encryption key;

using a header encryption key, encrypting the combined print restrictions, the document encryption key, and the authentication information associated with the designated document;

appending the encrypted combined print restrictions, the encrypted document encryption key, and the authentication information to the encrypted designated document, within a document header;

decrypting, by the client computer, the encrypted document encryption key using the header encryption key;

decrypting, by the client computer, the encrypted designated document using the decrypted document encryption key;

subsequently intercepting a print request from the client computer, to print the designated document;

transmitting, by the client computer, an identifier of the designated document, the encrypted combined print restrictions, and the encrypted authentication information, to a printer server;

decrypting, by the printer server, the encrypted combined print restrictions and the encrypted authentication information;

requesting, by the printer server, retrieval of the designated document from the DMS based on the identifier of the designated document and the decrypted authentication information;

obtaining, by the printer server, print options from the client computer; and determining, by the printer server, whether the client computer is allowed to print the designated document, based on the decrypted combined print restrictions and the obtained print options.

2. The method of claim 1 wherein the web-based print restrictions include a list of permissible printers.

3. The method of claim 1 wherein the identifier of the designated document is a URL for the designated document.

4. The method of claim 1 wherein the authentication information includes a username and a password.

5. The method of claim 1 wherein said decrypting, by the client computer, the encrypted document encryption key comprises obtaining the header encryption key from a key server.

6. The method of claim 1 wherein the web-based print restrictions include watermark attributes, and wherein said determining, by the printer server, whether the client computer is allowed to print the designated document comprises identifying a visible watermark to overlay on the designated document based on the watermark attributes.

7. The method of claim 1, wherein the plurality of documents stored in the DMS include web pages.

8. The method of claim 1, wherein the plurality of documents stored in the DMS include application documents.

9. A method for secure printing, comprising:

providing a document management system (DMS) that stores and retrieves a plurality of documents, wherein at least a portion of the documents require authentication information for access, and have DMS print restrictions associated therewith;

providing a web-based capture protection system that prevents proprietary content displayed on a display device from being screen-captured, wherein such proprietary content has web-based print restrictions which limit its being printed;

intercepting a retrieval request from a client computer, to retrieve a designated document from the DMS;

deriving combined print restrictions for the designated document by combining (1) the DMS print restrictions associated with the designated document and (2) the web-based print restrictions to restrict printing of proprietary content contained in the designated document;

encrypting the designated document using a document encryption key;

using a header encryption key, encrypting the combined print restrictions, the document encryption key, and the authentication information associated with the designated document;

appending the encrypted combined print restrictions, the encrypted document encryption key, and the authentication information to the encrypted designated document, within a document header;

decrypting, by the client computer, the encrypted combined print restrictions, the encrypted document encryption key, and the authentication information using the header encryption key;

decrypting, by the client computer, the encrypted designated document using the decrypted document encryption key;

subsequently intercepting a print request from the client computer, to print the designated document;

transmitting, by the client computer, an identifier of the designated document, the decrypted combined print restrictions, and the decrypted authentication information, to a printer server;

requesting, by the printer server, retrieval of the designated document from the DMS based on the identifier of the designated document and the decrypted authentication information;

obtaining, by the printer server, print options from the client computer; and determining, by the printer server, whether the client computer is allowed to print the designated document, based on the decrypted combined print restrictions and the obtained print options.

10. A method for secure printing, comprising:

providing a document management system (DMS) that stores and retrieves a plurality of documents, wherein at least a portion of the documents require authentication information for access, and have DMS print restrictions associated therewith;

providing a web-based capture protection system that prevents proprietary content displayed on a display device from being screen-captured, wherein such proprietary content has web-based print restrictions which limit its being printed;

intercepting a retrieval request from a client computer, to retrieve a designated document from the DMS;

deriving combined print restrictions for the designated document by combining (1) the DMS print restrictions associated with the designated document and (2) the web-based print restrictions to restrict printing of proprietary content contained in the designated document;

encrypting the designated document using a document encryption key; using a header encryption key, encrypting the combined print restrictions, the document encryption key, and the authentication information associated with the designated document;

appending the encrypted combined print restrictions, the encrypted document encryption key, and the authentication information to the designated document, within a document header;

transmitting, by the client computer, the encrypted combined print restrictions, the encrypted document encryption key, and the authentication information to a key server for decryption;

receiving, by the client computer from the key server, decrypted combined print restrictions, a decrypted document encryption key and decrypted authentication information;

decrypting, by the client computer, the encrypted document using the decrypted document encryption key;

subsequently intercepting a print request from the client computer, to print the designated document;

transmitting, by the client computer, an identifier of the designated document, the decrypted combined print restrictions and the decrypted authentication information to a printer server;

requesting, by the printer server, retrieval of the designated document from the DMS based on the identifier of the designated document and the decrypted authentication information;

obtaining, by the printer server, print options from the client computer; and determining, by the printer server, whether the client computer is allowed to print the designated document, based on the decrypted combined print restrictions and the obtained print options.

*11. A server, comprising:*

*at least one memory device configured to store instructions;*

*at least one processing device configured to execute the instructions stored in the at least one memory device to:*

*intercept a request from a client to retrieve a designated document from a document management system (DMS) configured to manage a plurality of documents, wherein at least a portion of the plurality of documents comprise authentication information for access and wherein at least a portion of the plurality of document comprise print restrictions associated therewith;*

*derive combined print restrictions for the designated document by combining the print restrictions associated with the designated document and web-based print restrictions associated with the designated document that prevents proprietary content associated with the designated document and displayed on a display device from being printed;*

*generate an encrypted designated document by encrypting the designated document using a document encryption key;*

*generate encrypted combined print restrictions by encrypting the combined print restrictions, the document encryption key, and the authentication information associated with the designated document using a header encryption key;*

*append the encrypted combined print restrictions, the document encryption key, and the authentication information to a header of the encrypted designated document;*

*transmit the encrypted designated document to a client that is configured to decrypt the document encryption key using the header encryption key, decrypt the encrypted designated document using the decrypted document encryption key, intercept a print request to print the designated document, transmit an identifier of the designated document, the encrypted combined print restrictions, and the encrypted authentication information, to a printer server that is configured to decrypt the encrypted combined print restrictions and the encrypted authentication information, request retrieval of the designated document from the DMS based on the identifier of the designated document and the decrypted authentication information, obtain print options from the client, and transmit an instruction to print the designated document in response to determining that the client is authorized to print the designated document based on the decrypted combined print restrictions and the obtained print options.*

*12. The server of claim 11, wherein the web-based print restrictions comprise a list of printers authorized to print the designated document.*

*13. The server of claim 11, wherein the identifier of the designated document comprise a universal resource locator associated with the designated document.*

*14. The server of claim 11, wherein the authentication information comprises a username, a password, or a combination of the username and the password.*

*15. The server of claim 11, wherein the client is further configured to obtain the header encryption key from a key server.*

*16. The server of claim 11,*

*wherein the web-based print restrictions comprise watermark attributes; and*

*wherein the print server is further configured to identify a visible watermark to overlay on the designated document based on the watermark attributes.*

*17. The server of claim 11, wherein the plurality of documents comprise web pages.*

*18. The server of claim 11, wherein the plurality of documents comprise application documents.*

*19. A memory device having instructions stored thereon that, in response to execution by a processing device, cause the processing device to perform operations comprising:*

*intercepting a request from a client to retrieve a designated document from a document management system (DMS) configured to manage a plurality of documents, wherein at least a portion of the plurality of documents comprise authentication information for access and wherein at least a portion of the plurality of document comprise print restrictions associated therewith;*

*generating combined print restrictions for the designated document by combining the print restrictions associated with the designated document and web-based print restrictions associated with the designated document that prevents proprietary content associated with the designated document and displayed on a display device from being printed;*

*generating an encrypted designated document by encrypting the designated document using a document encryption key;*

*generating encrypted combined print restrictions by encrypting the combined print restrictions, the document encryption key, and the authentication information associated with the designated document using a header encryption key;*

*appending the encrypted combined print restrictions, the document encryption key, and the authentication information to a header of the encrypted designated document;*

*transmitting the encrypted designated document to a client that is configured to transmit an identifier of the designated document, the encrypted combined print restrictions, and the encrypted authentication information, to a printer server that is configured to request retrieval of the designated document from the DMS based on the identifier of the designated document and configured to transmit an instruction to print the designated document in response to determining that the client is authorized to print the designated document based on decrypting the encrypted combined print restrictions.*

*20. The memory device of claim 19, wherein the web-based print restrictions comprise a list of printers authorized to print the designated document.*

*21. The memory device of claim 19, wherein the identifier of the designated document comprise a universal resource locator associated with the designated document.*

*22. The memory device of claim 19, wherein the authentication information comprises a username, a password, or a combination of the username and the password.*

*23. The memory device of claim 19, wherein the client is further configured to obtain the header encryption key from a key server.*

*24. The memory device of claim 19,*

*wherein the web-based print restrictions comprise watermark attributes; and*

*wherein the print server is further configured to identify a visible watermark to overlay on the designated document based on the watermark attributes.*

*25. The memory device of claim 19, wherein the plurality of documents comprise web pages.*

*26. The memory device of claim 19, wherein the plurality of documents comprise application documents.*

*27. A server, comprising:*

*an intercepting circuit communicatively coupled to a document management system, a print server, and a client and configured to:*

*receive a request from the client to retrieve, from the document management system, a designated document comprising authentication information for access and comprising print restrictions associated therewith;*

*derive combined print restrictions for the designated document by combining the print restrictions associated with the designated document and web-based print restrictions associated with the designated document that prevents proprietary content associated with the designated document and displayed on a display device from being printed;*

*generate an encrypted designated document by encrypting the designated document using a document encryption key;*

*generate encrypted combined print restrictions by encrypting the combined print restrictions, the document encryption key, and the authentication information associated with the designated document using a header encryption key;*

*append the encrypted combined print restrictions, the document encryption key, and the authentication information to a header of the encrypted designated document;*

*transmit the encrypted designated document to the client;*

*wherein the client is configured to decrypt the encrypted designated document, receive a print request to print the designated document, and transmit an identifier of the designated document, the encrypted combined print restrictions, and the encrypted authentication information, to the printer server; and*

*wherein the print server is configured to decrypt the encrypted combined print restrictions and the encrypted authentication information, request retrieval of the designated document from the DMS in response to the identifier of the designated document and the decrypted authentication information, obtain print options from the client, and transmit an instruction to print the designated document in response to determining that the client is authorized to print the designated document based on the decrypted combined print restrictions and the obtained print options.*

*28. The server of claim 27, wherein the web-based print restrictions comprise a list of printers authorized to print the designated document.*

*29. The server of claim 27, wherein the identifier of the designated document comprise a universal resource locator associated with the designated document.*

*30. The server of claim 27, wherein the authentication information comprises a username, a password, or a combination of the username and the password.*

*31. The server of claim 27, wherein the client is further configured to obtain the header encryption key from a key server.*

*32. The server of claim 27,*

*wherein the web-based print restrictions comprise watermark attributes; and*

*wherein the print server is further configured to identify a visible watermark to overlay on the designated document based on the watermark attributes.*

*33. The server of claim 27, wherein the plurality of documents comprise web pages.*

*34. The server of claim 27, wherein the plurality of documents comprise application documents.*

* * * * *